(No Model.)

W. JEFFERYS.
MANURE RECEPTACLE FOR CARS, &c.

No. 489,309. Patented Jan. 3, 1893.

Witnesses:
J. B. McGirr.
W. P. Renshaw

Inventor.
William Jefferys
By his Attorneys,
Edson Bro's

UNITED STATES PATENT OFFICE.

WILLIAM JEFFERYS, OF EAST ORANGE, NEW JERSEY.

MANURE-RECEPTACLE FOR CARS, &c.

SPECIFICATION forming part of Letters Patent No. 489,309, dated January 3, 1893.

Application filed December 15, 1891. Serial No. 415,201. (No model.)

*To all whom it may concern:*

Be it known that I, WILLIAM JEFFERYS, a citizen of the United States, and a resident of East Orange, in the county of Essex and State of New Jersey, have invented certain new and useful Sanitary Attachments or Mechanical Appliances for the Reception of the Droppings of Animals, &c., of which the following is a specification.

My invention relates to a sanitary attachment adapted to collect and retain the excrements of animals attached to vehicles; and the object in view is to provide means adapted to be attached to the harness of the animal so as to hold the conduit in a yielding position without chafing and annoying the animal and prevent the conduit from communicating "horse-motion" to the receptacle which is rigidly suspended in any suitable way from the vehicle.

With these ends in view, the improvement consists in the combination of devices and novel construction and arrangement of parts which will be hereinafter fully described and claimed.

Figure 1:
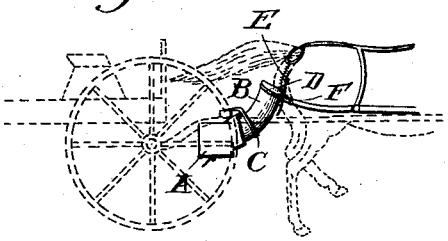
Figure 2:
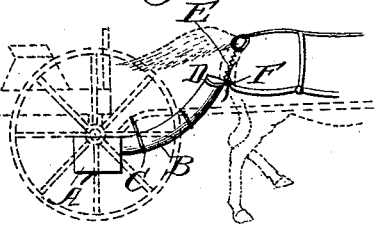
Figure 3:
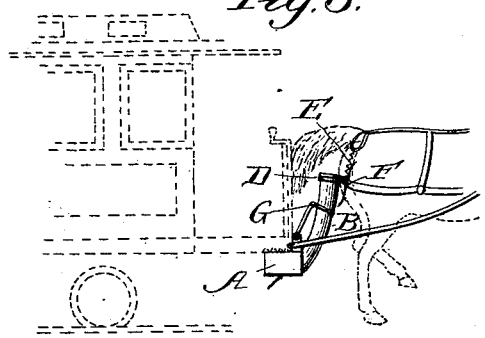
Figure 4:
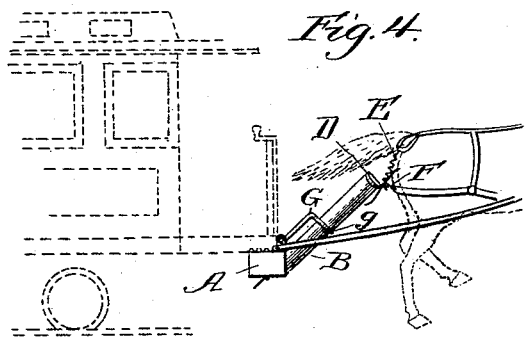
Figure 5:
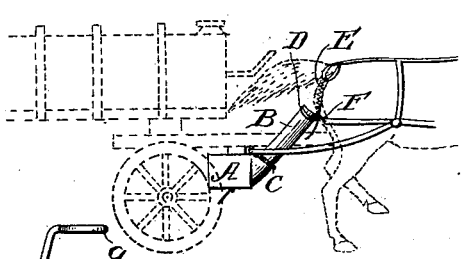
Figure 6:
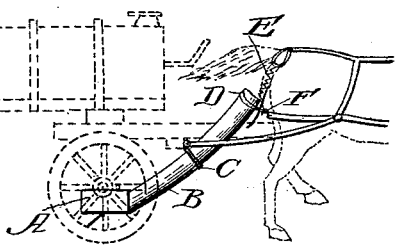
Figure 9:
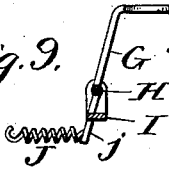
Figure 8:
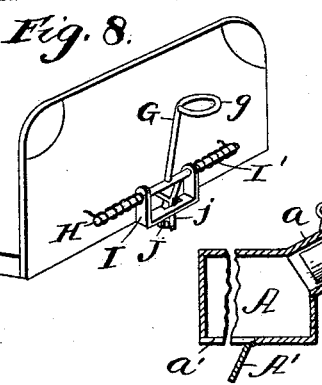
Figure 7:
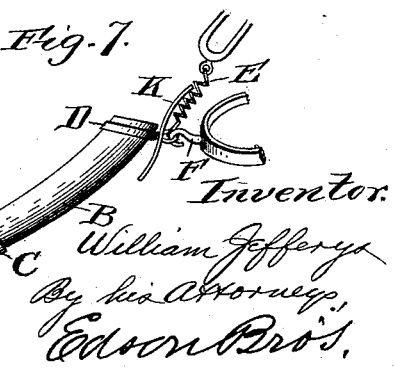

In the drawings, I have illustrated several embodiments of my invention for different styles of vehicles, Figures 1 and 2 showing in side view the receptacle suspended from the cross piece of the thills. Figs. 3 and 4 are side views of a portion of a street car with my sanitary appliance. Figs. 5 and 6 show the receptacle suspended from the tongue and axle of a box-vehicle or farm wagon. Fig. 7 is an enlarged view, partly in section, showing the appliances for holding the conduit in position relative to the harness and the receptacle. Fig. 8 is an enlarged detail view of the devices employed on a vehicle, such as a street car, shown in Figs. 3 and 4, to hold the weight of the conduit off the animal. Fig. 9 is a detail view, showing in side elevation the conduit-supporting arm and the elevating spring therefor and in section the fixed bracket and the rock-shaft, to which shaft the arm and spring are connected.

Like letters of reference denote corresponding parts in the several figures of the drawings, referring to which—

A designates the receptacle, and B is the conduit or tube which is adapted to receive the excrements of the animal and conduct the same to the receptacle.

I am aware that prior to my invention a receptacle and tube have been provided to catch and retain the excrement of an animal attached to a vehicle, but such conduit and receptacle were sustained by a counterbalancing weight which I dispense with and employ means that positively and yieldingly hold the conduit in proper position without chafing and annoying the animal and which does not communicate any motion of the animal to the receptacle, the latter being rigidly suspended in any suitable way from any part of the vehicle. This receptacle A is preferably provided with a mouth or neck $a$ in which is loosely fitted the lower end of the conduit and which is free to slide or telescope therein, as indicated in Fig. 7; and to said lower end of the conduit is secured an elastic or flexible band C which encircles the conduit and is suitably secured to the receptacle, said elastic band permitting the conduit to have the desired play. This conduit is made of any desirable material, preferably of liquid proof fabric, and near the upper end of said conduit is secured an elastic band or ribbon D, said band or ribbon having connected thereto devices E, F, whereby to fasten the upper end of the conduit to the harness of the animal. The connecting device E is preferably in the form of a spiral spring having one end secured to the crupper of the harness, and the device F is a hook and eye to connect the breeching of the harness. By means of the elastic connections D, E, and the connection F between the conduit, the receptacle and the harness, the conduit is held yieldingly in position, without annoying the animal, and is adapted to convey the drippings to the receptacle which remains rigidly suspended from the vehicle.

In Figs. 1 and 2, the receptacle is shown suspended from the cross bar which connects the thills of the vehicle; in Fig. 5 the receptacle is secured to the tongue of a wagon, and in Fig. 6 said receptacle is suspended from the axle of the wagon, the conduit in the latter instance being lengthened and having a middle suspension band as shown. The receptacle is provided in its bottom with an opening $a'$ adapted to discharge the contents thereof, and said opening is normally closed by a suitable door or flap $A'$, see Fig. 7.

In Figs. 3, 4 and 8, I have illustrated another embodiment of my invention which is especially adapted for use on street cars and similar vehicles. In this case the receptacle is suspended from the floor or body of the car. The upper end of the conduit is sustained in place by the connections E, F, adapted to fasten to the harness, and said conduit is further sustained by a yielding hanger-arm G, having at its free end a loop $g$ which encircles and is secured to the conduit at an intermediate point of its length. The other end of this hanger arm is fastened to a rock-shaft H which is journaled in a bracket I secured rigidly to the dash board or any suitable place on the car, and this rock shaft is normally held by the torsion springs $I'$ so as to throw the free end of the hanger-arm upward toward the dash and raise the conduit, each of said springs having one end secured to the rock shaft and the other end to the dash. I may also employ an auxiliary push spring J which is arranged below the car-floor and has one end bearing against a pendent arm $j$ which is rigidly secured to the rock-shaft, whereby said spring J is made to assist the springs $I'$ in raising the hanger arm and conduit.

The operation of my invention will be readily understood from the foregoing description taken in connection with the drawings. A drip shield K is secured to the upper end of the conduit, as shown.

I am aware that changes in the form and proportion of parts and details of construction of the devices herein shown and described as an embodiment of my invention, may be made without departing from the spirit or sacrificing the advantages thereof, and I therefore reserve the right to make such changes as fairly fall within the scope of the same.

Having thus fully described my invention, what I claim as new and desire to secure by Letters Patent, is:—

1. The combination of a receptacle, a conduit having its lower end connected yieldingly to the receptacle to adapt the same to play therein, and yielding harness-attaching devices at the upper end of said conduit, substantially as and for the purpose described.

2. The combination of a receptacle, a conduit connected at its lower end to said receptacle, an elastic band secured to the upper end of said conduit, and a harness attaching spring connected to said band, substantially as described.

3. The combination with a receptacle, a conduit, harness attaching devices at the upper end of said conduit, and a yielding hanger connected to the conduit at an intermediate point of its length, substantially as described.

4. The combination with a receptacle, and a conduit, of the devices for connecting said conduit to the receptacle and the harness of an animal, a hanger arm connected to said conduit, and a spring controlled rock-shaft to which the hanger arm is secured, substantially as described.

Signed at East Orange, in the county of Essex and State of New Jersey, this 23d day of November, A. D. 1891.

WILLIAM JEFFERYS.

Witnesses:
J. F. GIBBINS,
C. W. WHEATON.